J. F. MacKAY.

BROODER.

APPLICATION FILED JAN. 30, 1917.

Reissued Jan. 8, 1918.

14,419

Inventor
John F. MacKay
By his Attorney
Fred A. Tucker

UNITED STATES PATENT OFFICE.

JOHN F. MACKAY, OF BORDENTOWN, NEW JERSEY.

BROODER.

14,419. Specification of Reissued Letters Patent. Reissued Jan. 8, 1918.

Original No. 1,103,887, dated July 14, 1914, Serial No. 774,149, filed June 17, 1913. Application for reissue filed January 30, 1917. Serial No. 145,538.

*To all whom it may concern:*

Be it known that I, JOHN F. MACKAY, a citizen of the United States, residing at Bordentown, in the county of Burlington and State of New Jersey, have invented certain new and useful Improvements in Brooders, of which the following is a specification, reference being had therein to the accompanying drawing.

This invention relates to brooders for raising incubator hatched chicks, and the principal object of the invention is to produce a simple and efficient colony brooder suitable for use either in doors or in the open and which will accommodate and safely care for a large number of chicks.

One object of the invention is to simplify and improve the heating apparatus, a coal stove or heater being employed.

A further object of the invention is to simplify and improve the means whereby the heat is regulated.

A further object of the invention is to produce a coal-burning brooder-heating apparatus to which fuel may be fed from the top without disturbing the brooder.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing.

Corresponding parts in the several figures are denoted by like characters of reference.

Figure 1:
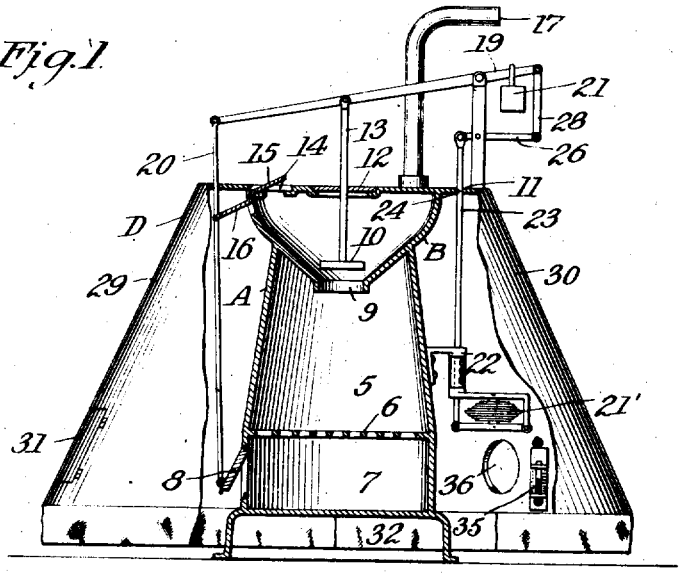
Figure 1 is a side elevation, partly in section, of a device constructed in accordance with the invention.
Figure 2:
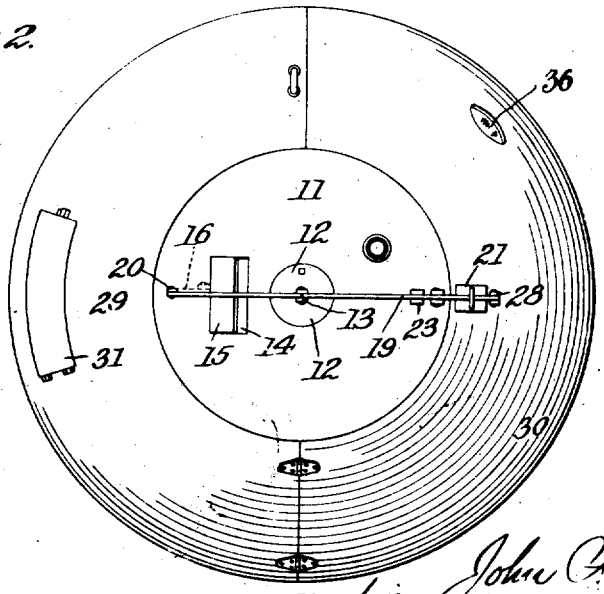
Fig. 2 is a top plan view of the same.

The heater of the improved brooder consists of a stove or furnace A of which 5 denotes the fire box, 6 the grate, and 7 the ash pit for which a draft door 8 in provided, said door being hinged at its upper edge, as shown, so that it will naturally gravitate to a closed position. The stove body, which has been shown as tapering upwardly, is provided at its upper end with a hopper B, the discharge opening of which, 9, is adapted to constitute a seat for a valve or damper 10. The hopper B, the upper portion of which flares beyond the stove body, is provided with a top plate 11 having an opening covered by a lid 12 which is located directly above the discharge opening 9 of the hopper. The lid 12 is apertured for the passage of the stem 13 that extends upwardly from the valve or damper 10. The top plate has an opening 14 which is located at one side thereof substantially in vertical alinement with the draft door 8; a valve or damper 15 whereby said opening may be obstructed is hinged adjacent to the outer edge of the opening, said damper being provided with an outwardly extending arm 16. A flue 17 for carrying off the products of combustion is mounted on the top plate 11.

Fulcrumed on a support 18 which rises from the top plate 11 is a lever 19, one arm of which is connected with the valve stem 13 and with one end of a flexible element 20, which latter is connected at its lower end with the damper 8 and intermediate its ends with the arm 16; the other arm of the lever 19 carries a counterweight 21 for approximately balancing the valves 10, 15 and 8. The parts are so arranged that when the door or valve 8 is wide open, the valve 15 will be seated, and the valve 10 will, likewise be wide open to permit products of combustion to pass from the fire box to the exit flue 17. As the valves 8 and 10 move in the direction of their respective seats the check valve or damper 15 will gradually be unseated.

A thermostat 21′ is supported on a bracket 22 extending from the stove body, said thermostat including a rod 23 which is guided through an aperture 24 in a portion of the top plate 11 which overhangs the stove body. The rod 23 is connected with the arm of the lever 19 that carries the counterweight 21 by means of an intermediate lever 26 fulcrumed on the upright 18 and a connecting member 28, said lever and connecting member being introduced for the purpose of increasing the movement of the lever 19 relatively to that of the rod 23, thereby rendering the operation of the device more effective.

The top plate 11 supports a downwardly flaring hood D which for convenience may be composed of hingedly connected members 29, 30, one of which may, furthermore, be provided with a door 31 through which access may be conveniently had to the interior for the purpose of removing ashes from the ash pit 7 and the like. A curtain 32 of flexible material depends from the lower edge of the hood D and terminates a short distance above the ground so as to afford ample protection while not hindering the ingress and egress of the chicks.

The operation and advantages of this invention will be readily understood from the foregoing description taken in connection with the drawings. Coal may be conveniently fed to the stove by manipulating the lever 19 so as to raise the valve 10 to a non-obstructing position and then sliding the lid 12 upwardly upon the valve stem; the fuel may then be introduced and will be guided over the downwardly inclined walls of the hopper through the aperture 9 and into the fire box. The valves or dampers will be automatically operated to regulate the draft so as to maintain the temperature evenly at a predetermined degree. The general construction is simple, inexpensive and thoroughly efficient for the purpose for which it is provided.

A thermometer 35 is provided to enable the temperature within the hood to be ascertained, and in the hood is formed a hole 36 through which the thermometer may be viewed.

It will be seen that the top plate covering the hopper extends laterally beyond the perimeter thereof all around the heater. This is a decidedly advantageous arrangement in a heater for a brooder, as it permits a hood of simple truncated cone form like that illustrated to be easily applied to and supported by the said plate, no particular fitting and shaping of the parts with reference to each other being necessary to secure practically air-tight joints when they are united. It will also be observed that the means by which the draft controlling dampers 8 and 15, and the closure 10, are controlled—the levers 19, 26, etc.—are supported by the said top plate, thus making a self-contained apparatus, or one supported by a single base. The check draft opening 14 is in the top plate and hence exposed, so that when the damper 15 is open the air taken in to check the draft is drawn from the open, and not from within the hood D, so that the temperature within the latter is not lowered by the inflow of outside air when the check damper is opened. Furthermore by making the heater with an opening in its top through which fuel may be fed to the fire chamber, and applying the hood so that it surrounds the heater but does not cover the top, I am enabled to practically use a coal or other solid fuel burner as the heater for a brooder and to replenish the fire with fuel from time to time as occasion requires, without having to open the brooder chamber, with the incident disadvantage of the loss of heat and danger from the confined air being contaminated by the escaping gases of combustion.

It will be seen that the hood which surrounds the coal-burning stove or heater A, considering the plate 11 as the top of the hood, is closed in its upper portions, and thereby traps a body of air that becomes highly heated from contact with the walls of the fire chamber of the stove. The flaring, depending, walls of the hood operate to deflect the hot air from the upper portion of the chamber toward the floor, thereby causing a circulation within the hood chamber and insuring that there shall be a mild heat maintained just above the floor space and within the confines of the brooder, where the chicks congregate. The differences in temperature between the upper contracted portion of the chamber inclosed by the hood, and the lower expanded parts thereof occupied by the chicks, are very great, the temperature of the upper part being very high and subject to considerable fluctuations, according to the condition of the fire within the heater A and of the outside temperature, while that in the lower parts of the brooder chamber is much lower and is more uniform; and in this respect a brooder heated by a stove burning solid fuel and arranged as shown in the drawings is radically different from the lamp heated brooders now in common use, where the temperature differences in different parts of the brooder chamber are not great, and where the more uniform temperature conditions are sought to be maintained by introducing into the brooder chamber a constantly renewed supply of heated air and products of combustion directly from the lamp. It therefore becomes desirable in an apparatus such as mine, to locate the thermostat in the lower part of the brooder chamber where the conditions approximate those of the portion occupied by the chicks themselves.

Having thus described my invention what I claim as new and desire to secure by Letters Patent, is:—

1. A heater for brooders having a fire box, a hopper disposed above and communicating with the fire box, a top plate covering the hopper and extending beyond the perimeter thereof entirely around the heater, dampers for controlling the draft of the heater, and means for controlling the dampers supported by the top plate of the hopper.

2. A heater for brooders having a fire box, a hopper disposed above and communicating with the fire box, a top plate covering the hopper and extending laterally beyond the perimeter thereof entirely around the heater, a closure controlling communication between the hopper and the fire box, dampers for controlling the draft of the heater, and means for controlling the movements of the closure and the dampers supported by the top plate of the hopper.

3. A heater for brooders having a fire box, a hopper disposed above and communicating with the fire box, a top plate covering the hopper and extending beyond the perimeter thereof entirely around the heater, there being a check draft opening through the top plate into the hopper, a damper for controlling the draft through said opening, a damper controlling the draft to the fire box, a closure controlling the communication between the hopper and fire box, and a single means supported on the said top plate and connecting respectively with the said dampers and closure, by which their movements are controlled.

4. The combination of a heater for burning solid fuel, having a chamber in its upper portion covered by a top through which is a fuel feed opening, a flue through which the products of combustion pass off communicating with the said chamber, a valve controlling the communication between the said chamber and the fire box of the heater, means for operating said valve supported by the heater, means carried by the heater for supporting a brooder hood, and a suspended hood supported by the said means so as to be free from the surface on which the heater rests and forming a brooder chamber surrounding the same.

5. The combination of a heater for burning solid fuel having a feed opening through its top, means carried by the heater for supporting a brooder hood, and a suspended hood supported by the said means so as to be free from the surface on which the heater rests and forming a brooder chamber surrounding the heater, the top of the hood being open so as to leave exposed the top of the heater, thereby permitting access to the fuel feed opening therein without disturbing the hood.

6. The combination of a heater for burning solid fuel, provided with a top perforated to permit fuel to be fed through it to the fire chamber of the heater, the top extending laterally beyond the heater, and a hood supported from the edge of the top and forming a brooder chamber entirely surrounding the heater.

7. The combination of a heater adapted to burn solid fuel, having a top perforated to permit fuel to be fed through it to the fire chamber, and perforated also to form a check draft opening, a hood supported by the heater and extending downward from the said top to inclose a brooder chamber, and a damper for the said check draft opening by which the draft through the same may be controlled.

8. The combination of a heater having a body portion formed of solid continuous walls with fuel and draft openings located above the body of the heater, a suspended hood projecting from the body of the heater and inclosing same and having the said fuel and draft openings outside the suspended hood, a thermostatic device also inclosed within said hood, and means connecting said thermostat with said draft opening, for the purpose specified.

9. The combination of a heater adapted to burn solid fuel having a top perforated with a flue opening, also perforated with a check draft opening, a valve mounted within said check draft opening, a hood supported by the heater and extending downwardly from said top to inclose a brooder chamber, and a thermostat located in said brooder chamber, and means connecting said thermostat with said check draft valve for the purpose specified.

10. The combination of a hard fuel heater, having a chamber in its upper portion, and a top with a perforation for the fuel, and a separate perforation for a check draft opening into said chamber, a hover supported by the heater to inclose a brooder chamber, a valve for said check draft opening adapted to close said opening whenever desired, and a thermostat located within said brooder chamber having connection with said valve to control the temperature of said brooder chamber.

11. The combination of a heater adapted to burn solid fuel having a chamber in a separate portion thereof and having a top to said chamber perforated to permit fuel to be fed to the same and further perforated to form an independent check draft opening, a hood supported by the heater, extending downwardly from the top to inclose a brooder chamber arranged with said opening outside of said hood, a valve for said check draft opening located within said opening and a thermostat in said brooder chamber, and means connecting said valve with said thermostat to control the temperature in said brooder chamber.

In testimony whereof I hereunto affix my signature.

JOHN F. MacKAY.